(12) United States Patent
Iida

(10) Patent No.: US 11,380,180 B2
(45) Date of Patent: Jul. 5, 2022

(54) NOTIFICATION APPARATUS, NOTIFICATION METHOD, NOTIFICATION SYSTEM, AND COMPUTER-READABLE RECORDING MEDIUM

(71) Applicant: NEC CORPORATION, Tokyo (JP)

(72) Inventor: Kenji Iida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/041,739

(22) PCT Filed: Feb. 1, 2019

(86) PCT No.: PCT/JP2019/003751
§ 371 (c)(1),
(2) Date: Sep. 25, 2020

(87) PCT Pub. No.: WO2019/187628
PCT Pub. Date: Oct. 3, 2019

(65) Prior Publication Data
US 2021/0027601 A1   Jan. 28, 2021

(30) Foreign Application Priority Data

Mar. 26, 2018 (JP) .............................. JP2018-058820

(51) Int. Cl.
*G08B 21/02* (2006.01)
*G08B 25/10* (2006.01)

(52) U.S. Cl.
CPC ..... *G08B 21/0283* (2013.01); *G08B 21/0272* (2013.01); *G08B 25/10* (2013.01)

(58) Field of Classification Search
CPC . G08B 21/0283; G08B 21/0272; G08B 25/10
See application file for complete search history.

(56) References Cited

U.S. PATENT DOCUMENTS 9,523,579 B2 * 12/2016 Lagnado ............... G01S 5/0027
2005/0030181 A1 * 2/2005 Mickle .................. H01Q 7/00
340/572.7

(Continued)

FOREIGN PATENT DOCUMENTS

JP   2000-278203 A   10/2000
JP   2003-218997 A    7/2003
(Continued)

OTHER PUBLICATIONS

"Efforts toward NTT advanced Technology Business Expansion for 40th Anniversary", Business Communication, vol. 53, No. 12, Dec. 1, 2016, pp. 50-51.

(Continued)

*Primary Examiner* — Hoi C Lau
(74) *Attorney, Agent, or Firm* — Sughrue Mion, PLLC

(57) ABSTRACT

The invention provides a notification apparatus 1 including an alarm sound generating unit 2 for generating alarm sounds, a location information obtaining unit 3 for obtaining location information, an activating unit 4 for activating the alarm sound generating unit 2 and the location information obtaining unit 3, a communication unit 5 for performing low-power wide-area wireless communication, and a control unit 6 for transmitting notification information via the communication unit 5 if the control unit 6 fails to obtain the location information from the location information obtaining unit 3 after the activating unit 4 activated the alarm sound generating unit 2, the notification information including notification apparatus identifying information identifying the notification apparatus a and notification occurrence information indicative of occurrence of notification.

9 Claims, 6 Drawing Sheets

(56) References Cited

U.S. PATENT DOCUMENTS

| | | | | |
|---|---|---|---|---|
| 2009/0005083 | A1* | 1/2009 | Hoshino | G01S 5/0236 |
| | | | | 455/457 |
| 2013/0260825 | A1* | 10/2013 | Hagenstad | H04M 1/0202 |
| | | | | 455/556.1 |
| 2015/0281926 | A1* | 10/2015 | Liu | H04W 4/16 |
| | | | | 455/558 |
| 2015/0294552 | A1* | 10/2015 | Langille | F16C 41/007 |
| | | | | 340/679 |
| 2017/0108715 | A1* | 4/2017 | Bauer | H04W 4/14 |
| 2018/0051962 | A1* | 2/2018 | Wong | G08B 25/016 |

FOREIGN PATENT DOCUMENTS

| | | | | |
|---|---|---|---|---|
| JP | 2006-333114 | A | | 12/2006 |
| JP | 2007-312165 | A | | 11/2007 |
| JP | 2007312165 | A | * | 11/2007 |
| JP | 2007-324780 | A | | 12/2007 |
| JP | 2011-091600 | A | | 5/2011 |
| JP | 2014-107623 | A | | 6/2014 |
| JP | 2014107623 | A | * | 6/2014 |
| JP | 2015-195560 | A | | 11/2015 |
| JP | 2016-139932 | A | | 8/2016 |
| JP | 2017-033514 | A | | 2/2017 |

OTHER PUBLICATIONS

Akiko Karashima, "Discussing Strategies from SoftBank, KCCS and Huawei. The Show is Finally Here! IoT with LPWA", Telecommunication, Nov. 25, 2016, vol. 33, No. 12, pp. 10-13.

International Search Report for PCT/JP2019/003751 dated Apr. 23, 2019 [PCT/ISA/210].

Written Opinion for PCT/JP2019/003751 dated Apr. 23, 2019 [PCT/ISA/237].

International Preliminary Report on Patentability with English translation of Written Opinion in International Application No. PCT/JP2019/003751, dated Sep. 29, 2020.

Partial Translation of "Efforts toward NTT advanced Technology Business Expansion for 40th Anniversary", Business Communication, vol. 53, No. 12, Dec. 1, 2016, pp. 50-51( 12 pages Total) (Previously Cited Sep. 25, 2020).

Partial Translation of Karashima, Akiko, "Discussing Strategies from SoftBank, KCCS and Huawei. The Show is Finally Here! IoT with LPWA", Telecommunication, Nov. 25, 2016, vol. 33, No. 12, pp. 10-13 (8 Pages Total) (Previously Cited Sep. 25, 2020).

Japanese Office Communication for JP Application No. 2020-510332 dated Dec. 14, 2021 with English Translation.

* cited by examiner

NOTIFICATION APPARATUS, NOTIFICATION METHOD, NOTIFICATION SYSTEM, AND COMPUTER-READABLE RECORDING MEDIUM

CROSS REFERENCE TO RELATED APPLICATIONS

This application is a National Stage of International Application No. PCT/JP2019/003751 filed Feb. 1, 2019, claiming priority based on Japanese Patent Application No. 2018-058820 filed Mar. 26, 2018.

TECHNICAL FIELD

The present invention relates to a notification apparatus, a notification method, a notification system for notifying a dangerous situation, and further to a computer-readable recording medium storing a program for realizing these.

BACKGROUND ART

Crime cases targeting children frequently occur, such as cases in which a child was nearly seduced to get on a car by a suspicious person whom the child met on the way home from school. In such social environments, parents, teachers, PTA (Parent-Teacher Association), neighborhood community associations, boards of education, and the like take some security measures for protecting children such as causing children to carry a personal alarm device, in order that such crime cases involving children victims may be reduced as much as possible.

However, even if a child turns on the personal alarm device in danger of being a prey of such a crime, alarm sounds would not reach to someone in vicinity in some cases. A reaching distance of the alarm sounds is, for example, about 50 m in any directions in outdoor, depending on surrounding environmental conditions. Therefore, if there are no people around within 50 m from the child in any directions, the dangerous situation cannot be notified to anyone, thereby possibly allowing the dangerous situation to continue.

In view of this, there have been some proposals for a personal alarm device capable of notifying that a child is in such a dangerous situation, even if the child is in a place from which the alarm sounds cannot reach someone around or even if the child is in a remote place. With such a personal alarm device, it is possible to transmit, to a remote place, information indicating that the child is in the dangerous situation, and information indicating a location of the personal alarm device.

Moreover, Patent Document 1 proposes a portable terminal provided with a personal alarm function. According to the portable terminal, a portable terminal configured to transmit location information to a server computer in a remote place via short-range wireless communication, the location information being obtained by GPS (Global Positioning System) or the like

LIST OF RELATED ART DOCUMENTS

Patent Document

Patent Document 1: Japanese Patent Laid-Open Publication No. 2015-195560

SUMMARY OF INVENTION

Problems to be Solved by the Invention

However, the portable terminal disclosed in Patent Document 1 is for the short-range wireless communication and therefore is merely capable of notifying terminals being capable of performing the short-range wireless communication and being located within a distance of 5 m to 30 m therefrom of the dangerous situation.

In view of this, use of wide-area wireless communication may be considered as a solution. However, the wide-area wireless communication consumes a greater amount of electricity compared with the short-range wireless communication, and therefore requires more frequent replacement or charging of a battery of the portable terminal. Moreover, the use of wide-area wireless communication for this purpose employs the same communication system as normal use of the wide-area wireless communication, thereby resulting in a greater communication cost.

Moreover, the portable terminal disclosed in Patent Document 1 obtains the location information by using the GPS, because it is necessary to find out details of the location of the portable terminal. Moreover, the portable terminal is such that a GPS communication module mounted on the portable terminal keeps at warm standby or hot standby for the personal alarm function.

In case of the warm standby, the portable terminal keeps ON the GPS communication module thereby to keep the GPS communication module ready for obtaining the location information anytime. Moreover, in case of the hot standby, the portable terminal keeps ON the GPS communication module, a wireless communication module, and a control module configured to control the GPS communication module and the wireless communication module, the wireless communication module and the control module being mounted on the portable terminal, and keeps the GPS communication module, the wireless communication module, and the control module ready for obtaining the location information anytime, and transmitting the obtained location information anytime.

Therefore, the portable terminal keeps consuming the electricity throughout the warm standby or the hot standby, thereby requiring frequent replacement or charging of the battery of the portable terminal. In view of this, it may be considered as a solution that, in order to reduce the electricity consumption of the GPS communication module, the GPS communication module is kept at cold standby (completely turned OFF) while the GPS communication is not being performed, and the GPS communication module is turned ON when to perform the GPS communication in order to obtain the location information. However, activation of the GPS communication module requires about 1 minute, and therefore this solution is not suitable for the personal alarm function.

An example object of the invention is to provide a notification apparatus, a notification method, a notification program, and a notification system that are capable of sending the notification to a range of places from short distance areas to remote areas, while reducing increases in the electricity consumption and the communication cost.

Means for Solving the Problems

To achieve the above example object, a notification apparatus according to an example aspect of the invention, including:

an alarm sound generating unit configured to generate alarm sounds;

a location information obtaining unit configured to obtain location information;

an activating unit configured to activate the alarm sound generating unit and the location information obtaining unit;

a communication unit configured to perform low-power wide-area wireless communication; and a control unit configured to transmit notification information via the communication unit if the control unit fails to obtain the location information from the location information obtaining unit after the activating unit activated the alarm sound generating unit, the notification information including notification apparatus identifying information for identifying the notification apparatus and notification occurrence information indicative of occurrence of notification.

Also, to achieve the above example object, a control method for a notification apparatus according to an example aspect of the invention, including:

(a) a step of transmitting notification information via a communication unit that performs low-power wide-area wireless communication if location information cannot be obtained from a location information obtaining unit that obtains the location information after an activating unit activated an alarm sound generating unit that generates alarm sounds, the notification information including notification apparatus identifying information for identifying the notification apparatus and notification occurrence information indicative of occurrence of notification.

Also, to achieve the above example object, a computer-readable recording medium that includes a control program for a notification apparatus recorded thereon according to an example aspect of the invention, the program including instructions that causes a processor to carry out:

(a) a step of transmitting notification information via a communication unit that performs low-power wide-area wireless communication if location information cannot be obtained from a location information obtaining unit that obtains the location information after an activating unit activated an alarm sound generating unit that generates alarm sounds, the notification information including notification apparatus identifying information for identifying the notification apparatus and notification occurrence information indicative of occurrence of notification.

Also, to achieve the above example object, a notification system according to an example aspect of the invention, including:

a notification apparatus configured to transmit first notification information if the notification apparatus fails to obtain location information after an alarm sound generating unit configured to generate alarm sounds is activated, the first notification information including notification apparatus identifying information identifying the notification apparatus and notification occurrence information indicative of occurrence of notification;

a wireless communication device configured to transmit second notification information if the wireless communication device receives the first notification information, the second notification information including, in addition to the first notification information, wireless communication device identifying information identifying the wireless communication device that received the first notification information, received radio wave intensity information indicative of an intensity of received radio waves measured when the first notification information was received, and wireless communication date and time information indicative of a date and time at which the first notification information was received; and an information generating apparatus configured to generate display information if the information generating apparatus receives the second notification information, the information generating apparatus generating the display information on the basis of the received radio wave intensity information and installation location information indicative of an installation location of the wireless communication device that received the first notification information, and the display information being for causing a terminal device to display, on a map, a location corresponding to the notification apparatus.

Also, to achieve the above example object, a notification method according to an example aspect of the invention, including:

(a) a step of transmitting first notification information if location information cannot be obtained after an alarm sound generating unit configured to generate alarm sounds is activated, the first notification information including notification apparatus identifying information identifying the notification apparatus and notification occurrence information indicative of occurrence of notification;

(b) a step of transmitting second notification information if the first notification information is received, the second notification information including, in addition to the first notification information, wireless communication device identifying information identifying the wireless communication device that received the first notification information, received radio wave intensity information indicative of an intensity of received radio waves measured when the first notification information was received, and wireless communication date and time information indicative of a date and time at which the first notification information was received; and (c) a step of generating display information if the second notification information is received, the display information being generated on the basis of the received radio wave intensity information and installation location information indicative of an installation location of the wireless communication device that received the first notification information, and the display information being for causing a terminal device to display, on a map, a location corresponding to the notification apparatus.

Also, to achieve the above example object, an information generating apparatus according to an example aspect of the invention, configured to generate display information if the information generating apparatus receives second notification information in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

Also, to achieve the above example object, an information generating method according to an example aspect of the invention, including:

(a) a step of generating display information if second notification information is received in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

Moreover, to achieve the above example object, a computer-readable recording medium that includes a program recorded thereon according to an example aspect of the invention, the program including instructions that causes a computer to carry out:

(a) a step of generating display information if second notification information is received in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

Advantageous Effects of the Invention

As described above, according to the invention, it is possible to send the notification to a range of places from short distance areas to remote areas, while reducing increases in the electricity consumption and the communication cost.

EXAMPLE EMBODIMENT

Example Embodiment

In the following, example embodiment of the invention will be described, referring to FIGS. 1 to 6.

Apparatus Configuration

Figure 1:
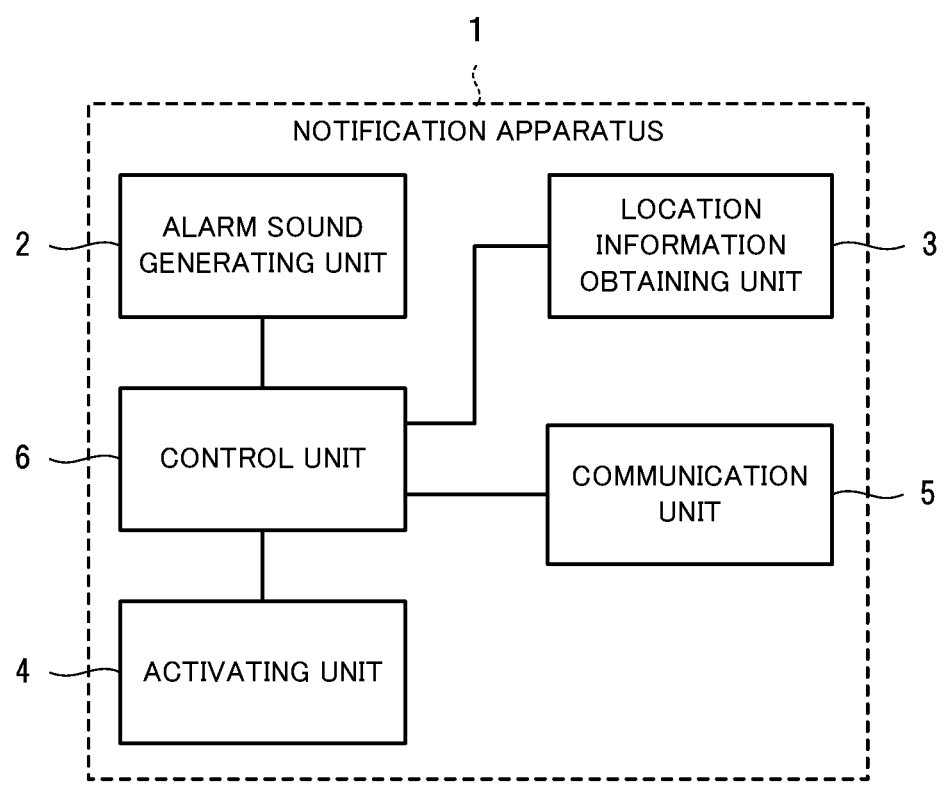
FIG. 1 is a view illustrating one example of a notification apparatus.

To begin with, a configuration of a notification apparatus according to an example embodiment will be described, referring to FIG. 1. FIG. 1 is a view illustrating one example of the notification apparatus.

A notification apparatus 1 according to the present example embodiment as illustrated in FIG. 1 is an apparatus capable of sending the notification to a range of places from short distance areas to remote areas, while reducing increases in the electricity consumption and the communication cost. As illustrated in FIG. 1, the notification apparatus 1 includes an alarm sound generating unit 2, a location information obtaining unit 3, an activating unit 4, a communication unit 5, and a control unit 6.

More specifically, the notification apparatus 1 includes the alarm sound generating unit 2 configured to generate alarm sounds, the location information obtaining unit 3 configured to obtain location information, the activating unit 4 configured to activate the alarm sound generating unit 2 and the location information obtaining unit 3, the communication unit 5 configured to perform low-power wide-area wireless communication, and the control unit 6 configured to control these units. Moreover, if the control unit 6 fails to obtain the location information from the location information obtaining unit 3 after the activating unit 4 activated the alarm sound generating unit 2, the control unit 6 transmits notification information via the communication unit 5, the notification information including notification apparatus identifying information for identifying the notification apparatus 1, and notification occurrence information indicative of occurrence of notification.

The notification apparatus 1 may be, for example, a personal buzzer alarm, an emergency notification apparatus for use by an elderly person, a disabled person, or the like when the person needs assistance. The alarm sound generating unit 2 may be, for example, a buzzer, a speaker, or the like. The activating unit 4 may be, for example, a pull-string trigger, a push-button trigger, or the like. The location information obtaining unit 3 is a device such as a GPS communication module. The communication unit 5 is a wireless communication module employing a communication scheme for realizing a long-distance communication with low electricity consumption. For example, the communication unit 5 may be, for example, a device such as LPWA (Low Power Wide Area) wireless communication module. The control unit 6 is a circuit formed with a CPU (Central Processing Unit), an FPGA (Field-programmable Gate Array), or the like.

As described above, according to the present example embodiment, the notification apparatus 1 is configured such that, in a normal situation, the location information obtaining unit 3 is at cold standby until the activating unit 4 activates the alarm sound generating unit 2, and that the communication unit 5 employs the low-power wide-area wireless communication, thereby making it possible to reduce an increase of the electricity consumption. Therefore, it is not necessary to perform frequently replacement or recharging of a power source such as a battery mounted on the notification apparatus 1. Moreover, the communication unit 5 employs the low-power wide-area wireless communication, thereby making it possible to lower communication cost, compared with a case where a wide-area wireless communication device is employed.

Furthermore, the notification apparatus 1 is capable of transmitting the notification information via the communication unit 5 even in a period between when the activating unit 4 activates the alarm sound generating unit 2 and when it becomes possible to obtain the location information from the location information obtaining unit 3, that is, in a period in which the location information obtaining unit 3 transits from the cold standby to the warm standby. Therefore, the notification apparatus 1 is capable of sending the notification to a range of places from short distance areas to remote areas soon after the alarming is triggered by the activating unit 4.

System Configuration

Figure 2:
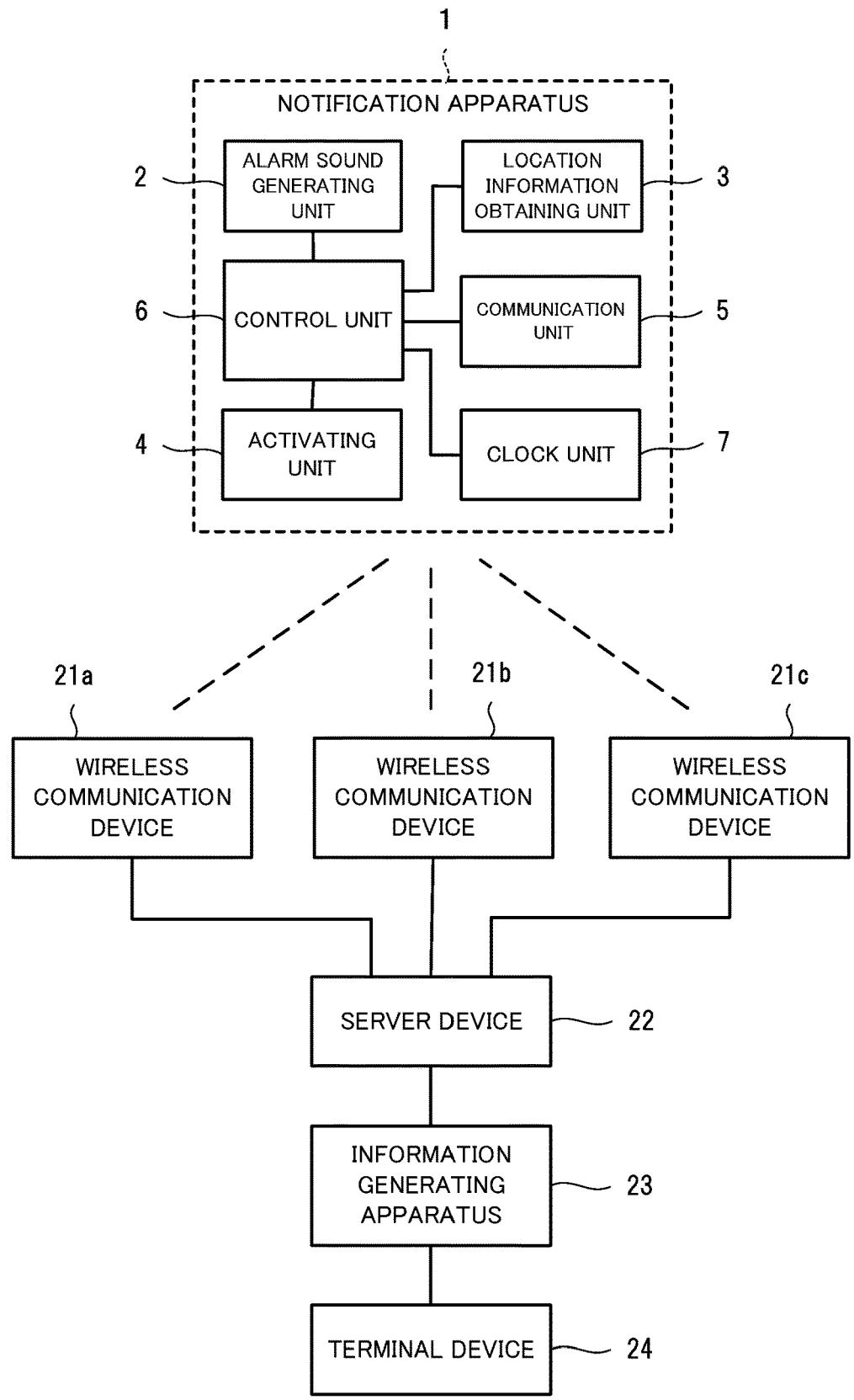
FIG. 2 is a view illustrating one example of a system including the notification apparatus.

Next, referring to FIG. 2, a notification system according to the present example embodiment will be described more specifically. FIG. 2 is a view illustrating one example of a system including the notification apparatus.

As illustrated in FIG. 2, a notification system 20 according to the present example embodiment includes the notification apparatus 1, a wireless communication device 21 (indicated as 21a, 21b, and 21c in FIG. 2), a server device 22, and an information generating apparatus 23. Moreover, the notification apparatus 1 illustrated in FIG. 2 includes a clock unit 7, in addition to the alarm sound generating unit 2, the location information obtaining unit 3, the activating unit 4, the communication unit 5, and the control unit 6.

The notification apparatus 1 is configured to generate the alarm sounds and transmit the notification information to the wireless communication device 21 in response to an operation of the activating unit 4 by a user (for example, an operation for pulling a pull string of a personal buzzer alarm). The notification apparatus 1 will be described more specifically.

The alarm sound generating unit 2 is configured to generate the alarm sounds with a volume large enough to notify the people around of the dangerous situation. If the control unit 6 detects the operation of the activating unit 4, the alarm sound generating unit 2 generates the alarm sounds according to an activation signal outputted by the control unit 6.

The location information obtaining unit 3 is configured to obtain, via the GPS or the like, location information indicative of a current position (latitude and longitude) of the notification apparatus 1, and transmit to the control unit 6 the location information thus obtained. The location information obtaining unit 3 is configured to transit from the cold standby to the warm standby in response to the activation signal outputted from the control unit 6 in case where the control unit 6 detects the operation of the activation unit 4.

The activating unit 4 is configured to output a signal indicative of the operation of the activation unit 4 to the control unit 6 in case where the activating unit 4 is operated by a user for the purpose of notification, for example, the pull string of the personal buzzer alarm is pulled. The control unit 6, which detects the signal, activates the alarm sound generating unit 2 and the location information obtaining unit 3.

The communication unit 5 is configured to perform the low-power wide-area wireless communication with the wireless communication device 21. The communication unit 5 is configured to transmit the notification information, which is transmitted from the control unit 6, to the wireless communication device 21, the notification information including the notification apparatus identifying information for identifying the notification apparatus 1 and notification occurrence information indicative of the generation of the notification.

The control unit 6 is configured to output the activation signal to the alarm sound generating unit 2, in case where the control unit 6 detects the operation of the activating unit 4, the activation signal instructing the generation of the alarm sounds. Moreover, the control unit 6 is configured to output the activation signal to the location information obtaining unit 3 in case where the control unit 6 detects the operation of the activating unit 4, the activation signal instructing the transition of the location information obtaining unit 3 from the cold standby to the warm standby.

In case where the control unit 6 fails to obtain the location information, the control unit 6 generates notification information (first notification information: notification information without the location information) including notification apparatus identifying information for identifying the notification apparatus 1 and notification occurrence information indicative of the generation of the notification, and the control unit 6 outputs to the communication unit 5 the notification information thus generated.

Moreover, In case where the control unit 6 obtains the location information after a predetermined time period is passed, the control unit 6 generates notification information including the notification apparatus identifying information, the notification occurrence information, and the location information (third notification information: notification information with the location information), and outputs to the communication unit 5 the notification information thus generated. The predetermined time period is a time period equal to or longer than a time period required for the transition from the cold standby to the warm standby.

The clock unit 7 is configured to time for a predetermined preset time when the activation unit 4 is restored to a pre-activation state, and output to the control unit 6 the time period thus timed. The control unit 6 may include the clock unit 7.

In case where the wireless communication device 21 receives the notification information transmitted from the communication unit 5, the wireless communication device 21 generates notification occurrence information (second notification information: notification information without the location information) to which wireless communication device identifying information for identifying the wireless communication device 21 that received the notification information (the first notification information: the notification information without the location information), received radio wave intensity information indicative of intensity of received radio waves that was measured when the notification occurrence information was received, and wireless communication date and time information indicative of a date and time at which the notification information was received are added, and the wireless communication device 21 transmits the notification occurrence information to the server device 22.

Moreover, in case where the wireless communication device 21 receives the notification information (the third notification: the notification information with the location information) transmitted from the communication unit 5, the wireless communication device 21 transmits the notification information (the third notification: the notification information with the location information) to the server device 22. The wireless communication device 21 may be, for example, an LPWA (low-power wide-area) wireless communication station gateway device, or the like.

In case where the server device 22 receives the notification information (the second notification information: the notification information without the location information, or the third notification information: the notification information with the location information) from the wireless communication device 21, the server device 22 transmits the notification information (the second notification information or the third notification information) to the information generating apparatus 23. The server device 22 may be, for example, an LPWA (low-power wide-area) network server device, or the like.

In case where the information generating apparatus 23 receives the notification information (the second notification information: the notification information without the location information) from the server device 22, the information generating apparatus 23 generates display information for performing display on a map based on the notification apparatus identifying information, the notification occurrence information, the wireless communication device identifying information, and installation location information indicative of an installation location of the wireless communication device 21 and map information that the information generating apparatus 23 have, the display indicating the wireless communication device 21 that received the notification information.

More specifically, the information generating apparatus 23 determines the installation location of the wireless communication device 21 on the map, referring to the notification device identifying information identifying the notification apparatus 1. Next, the information generating apparatus 23 generates the display information (first-stage display information) for causing a terminal device 24 to display, on the map, the installation location of the wireless communication device 21 that received the notification information, a report of the notification occurrence, the date and time of the notification occurrence, and/or the like.

For example, the display displays a circle whose center is an image indicating the wireless communication device 21 displayed on the map, and whose radius is set according to the received radio wave intensity information. That is, the display displays a range which is deduced to include where the notification was made. If the intensity of the received radio waves is strong, the circle is displayed in a smaller size, and if the intensity of the received radio waves is weak, the circle is displayed in a larger size. In this way, it is possible to roughly present a user an idea about the location where the notification apparatus 1 performed the transmission of the notification information.

Moreover, in case where the information generating apparatus 23 receives two pieces of notification information (second notification information) from two wireless communication devices 21, respectively, the information generating apparatus 23 refers to the received radio wave intensity information, and generates the display information (the first-stage display information) on the basis of the installation location of the wireless communication device 21 whose intensity of the received radio waves is stronger.

Furthermore, in case where the information generating apparatus 23 receives three or more pieces of notification information (the second notification information) from three or more wireless communication devices 21, respectively, the information generating apparatus 23 refers to the received radio wave intensity information, and calculates out the location of the notification apparatus 1 by triangulation using the installation locations of the wireless communication devices 21 whose intensities of the received radio waves are stronger. Next the information generating apparatus 23 generates display information (second-stage display information) for displaying, on map information, a result of the calculation of the triangulation. In this way, it is possible to more specifically present the user an idea about the location of the notification apparatus 1 that performed the transmission of the notification information, than the first-stage display information.

In case where the information generating apparatus 23 then receives the notification information (the third notification information: the notification information with the location information) from the server device 22, the information generating apparatus 23 generates display information (third-stage display information) for performing display on the map on the basis of the location information and the map information, the display indicating the wireless communication device 21 that received the notification information.

More specifically, the information generating apparatus 23 determines the installation location of the wireless communication device 21 on the map by using the location information. Next, the information generating apparatus 23 generates the display information (the third-stage display information) for causing the terminal device 24 to display, on the map, the more specific location of the notification apparatus 1 from which the notification information was received, the report of the notification occurrence, and the date and time of the notification occurrence, and/or the like. The information generating apparatus 23 is an application server device or the like.

The terminal device 24 is configured to obtain via a network the display information thus generated by the information generating apparatus 23, and to perform the display according to the display information. The terminal device 24 may be, for example, a mobile phone, a smartphone, a personal computer, or the like.

Modification

One exemplary modification will be described herein. For example, in case where a personal buzzer alarm with the communication function as described above is used, the personal buzzer alarm would not only stop the alarming but also stop the communication function if an attacker restored the pull string of the personal buzzer alarm to an original state. Accordingly, the dangerous situation would persist.

In view of this, this modification is configured such that, if the activating unit 4 is returned to the pre-activation state, the control unit 6 outputs to the alarm sound generating unit 2 a stop signal for stopping the alarm sounds, thereby stopping the alarm sounds, meanwhile the control unit 6 instructs the clock unit 7 to time for the predetermined preset time when the activating unit 4 is returned to the pre-activation state.

Next, while the timing operation is being carried out, the control unit 6 keeps transmitting the notification information (the third notification information: the notification with the location information) to the wireless communication device 21 via the communication unit 5 even if the activating unit 4 is returned to the pre-activation state. When the clock unit 7 finishes the timing operation for the preset time, the transmission of the notification information (the third notification information: the notification information with the location information) is stopped. Moreover, the control unit 6 causes the location information obtaining unit 3 to transit to the cold standby.

In this way, if the activating unit 4 is returned to the pre-activation state (for example, the pull string of the personal buzzer alarm is restored), the transmission of the notification information (the third notification information: the notification information with the location information) is continued for the preset time. Therefore, even if the alarming of the buzzer is not heard by other people, the low-power wide-area wireless communication can be continued, thereby making it possible to confirm the location of the notification apparatus 1 remotely. Thus, it is possible to send a rescue to the dangerous situation that would still persist.

Other Examples

The notification apparatus 1 may include another activating unit in addition to the activating unit 4, the another activating unit being configured to activate not the alarm sound generating unit 2, but the location information obtaining unit 3. That is, it may be configured to provide such an option that only the location information obtaining unit 3 is activated and only the location information is transmitted. In this way, the notification apparatus 1 may become applicable as an emergency notification apparatus for use in contacting a taxi company, a local care supporter, or the like when an elderly person or a disabled person in a remote area needs a support, apart from for use by parents, family members, teachers, and police.

Moreover, the notification apparatus 1 may be configured without the location information obtaining unit 3, so that the information generating apparatus 23 does not generate the third-stage display information. That is, the information generating apparatus 23 may be configured to generate the first-stage and second stage display information only. In this way, the notification apparatus 1 may be lower in price.

Further, a notification system 20 may be configured by including the notification apparatus 1, the wireless communication device 21, and the server device 22. That is, the function of the information generating apparatus 23 for generating the display information may be provided in the server device 22. By omitting the information generating apparatus 23 in this way, it may become possible to lower a price for installing a notification service.

Apparatus Operations

Figure 3:
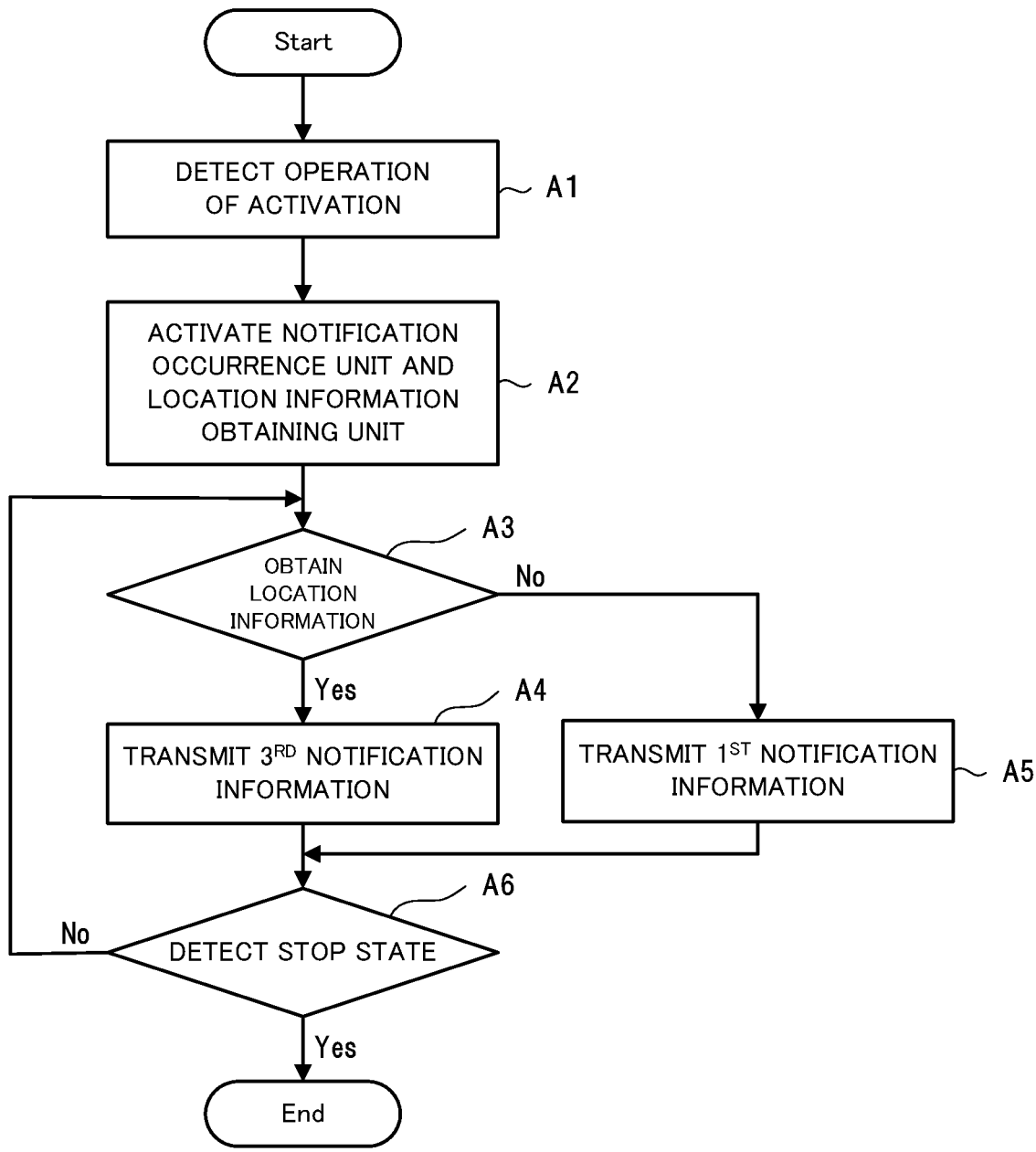
FIG. 3 is a view illustrating one example of an operation of the notification apparatus.
Figure 4:
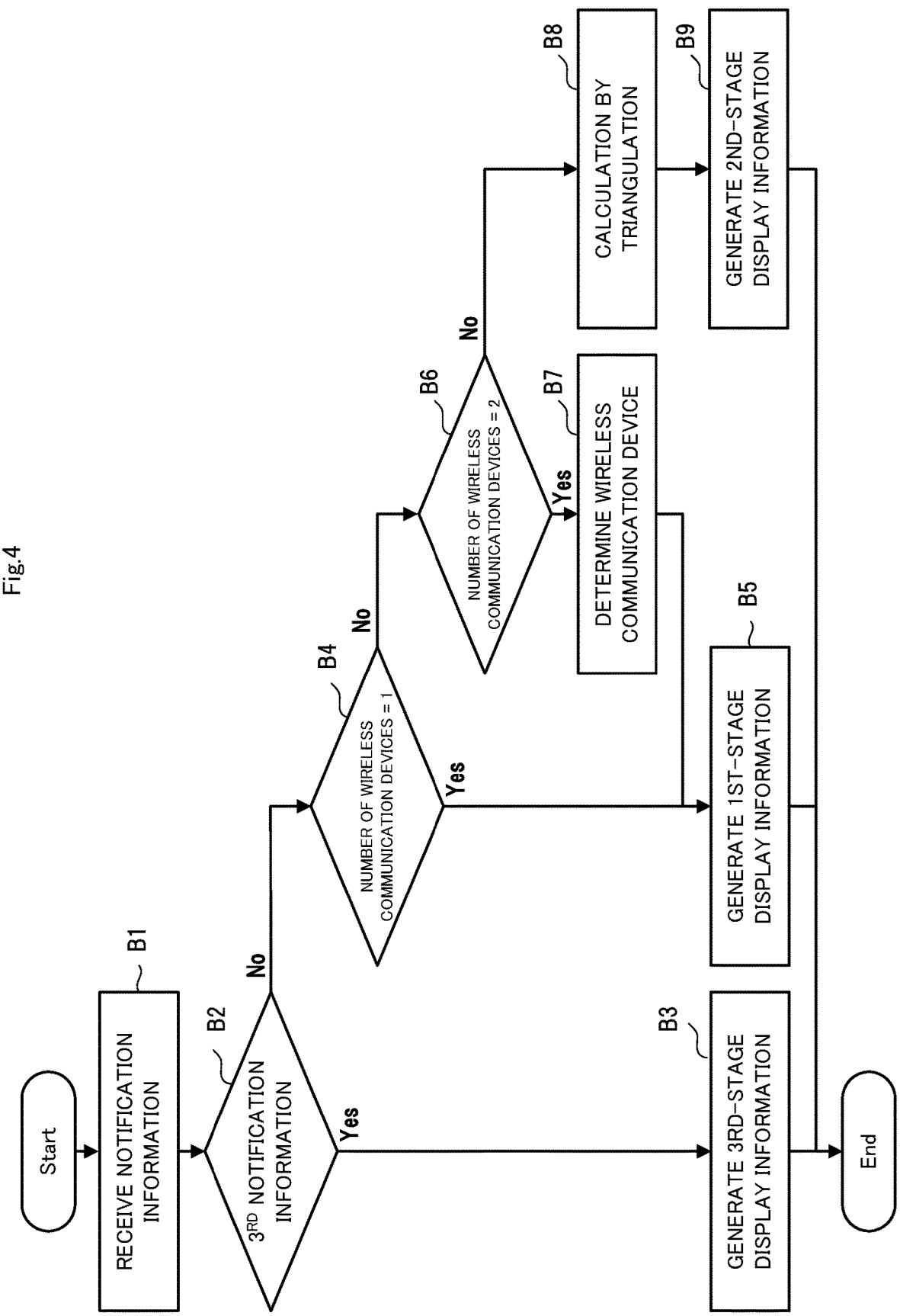
FIG. 4 is a view illustrating one example of an operation of an information generating apparatus.
Figure 5:
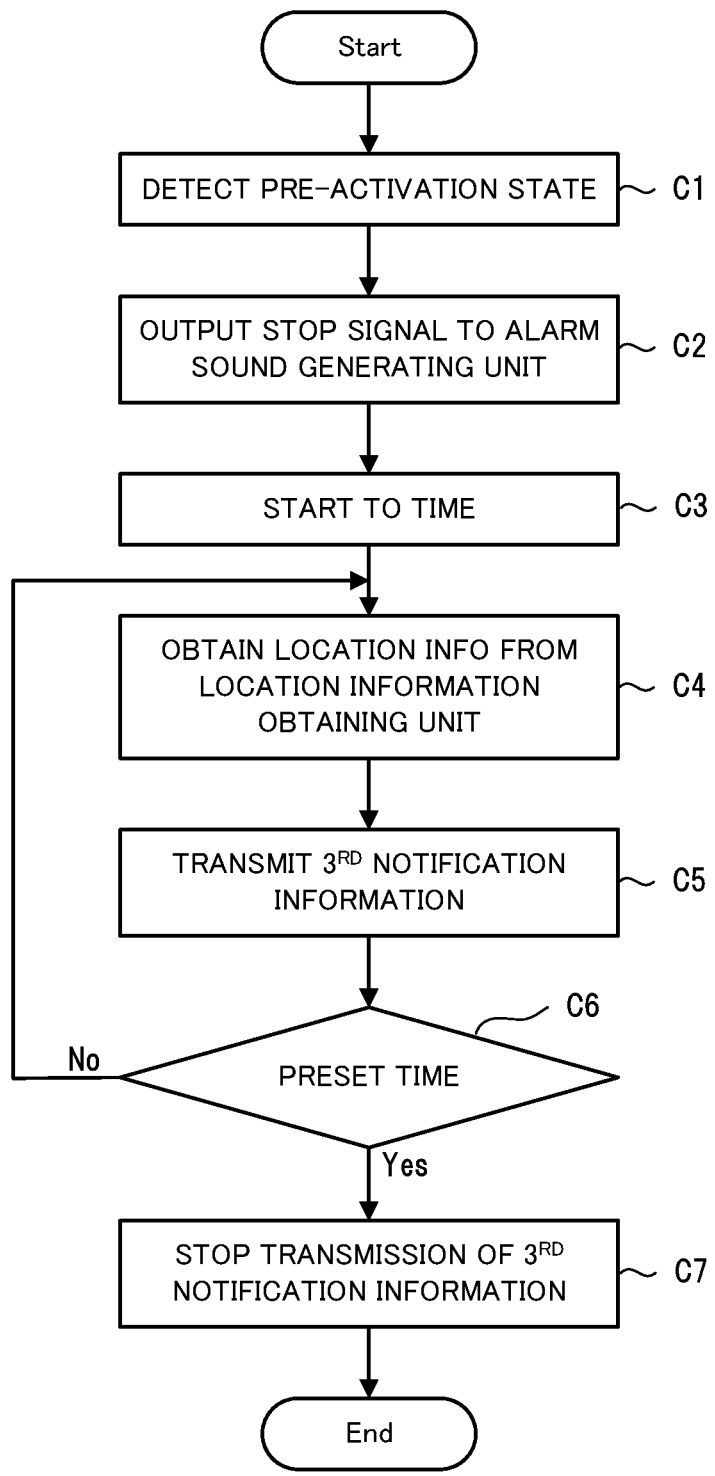
FIG. 5 is a view illustrating a modification of the operation of the notification apparatus.

Next, an operation of the notification apparatus 1 according to an example embodiment of the invention will be described, referring to FIG. 3. FIG. 3 is a view illustrating one example of the operation of the notification apparatus. Moreover, an operation of the information generating apparatus 23 according to the present example embodiment of the invention will be described, referring to FIG. 4. FIG. 4 is a view illustrating one example of the operation of the information generating apparatus. Further, a modification of the notification apparatus according to the present example embodiment of the invention will be described, referring to FIG. 5. FIG. 5 is a view illustrating a modification of the operation of the notification apparatus.

In the explanation below, FIGS. 1 to 3 will be referred where appropriate. Moreover, in the present example embodiment, a notification method is carried out by operating the notification apparatus. Thus, the explanation of the notification method is substituted by the explanation of the operation of the notification apparatus below. Further, in the present example embodiment, an information generating method is carried out by operating the information generating apparatus. Thus, the explanation of the information generating method is substituted by the explanation of the operation of the information generating apparatus below.

The operation of the notification apparatus 1 will be described herein.

As illustrated in FIG. 3, to begin with, the control unit 6 detects the operation of the activating unit 4 (Step A1). Then, the control unit 6 activates the alarm sound generating unit 2 and the location information obtaining unit 3 (Step A2). Then, the control unit 6 judges whether or not the location information obtaining unit 3 has obtained the location information (Step A3). If the location information obtaining unit 3 has obtained the location information (Step A3: Yes), then the control unit 6 transmits the third notification information to the wireless communication device 21 via the communication unit 5 (Step A4). If the location information obtaining unit 3 has not obtained the location information (Step A3: No), then the control unit 6 transmits the first notification information to the wireless communication device 21 via the communication unit 5 (Step A5). Then, the control unit 6 detects whether or not the activating unit 4 has been restored to the original stage (Step A6). That is, the control unit 6 detects whether or not the notification apparatus 1 is in a stop condition. If the control unit 6 detects that the notification apparatus 1 has been transited to the stop condition (Step A6: Yes), the process is ended. Moreover, if the notification apparatus 1 has not been transited to the stop condition (Step A6: No), the process from Step A3 to A6 is repeated.

Steps A1 to A6 will be described in detail.

At Step A1, the control unit 6 detects a signal indicative of the operation of activating unit 4, the signal being outputted by the activating unit 4 if the activating unit 4 is operated by the user for notification, for example if the pull string of the personal buzzer alarm is pulled.

At Step A2, if the control unit 6 detects the operation of the activating unit 4, the control unit 6 outputs to the alarm sound generating unit 2 the activation signal for instructing the generation of the alarm sounds. Moreover, if the control unit 6 detects the operation of the activating unit 4, the control unit 6 outputs the activation signal to the location information obtaining unit 3, thereby causing the location information obtaining unit 3 to transit from the cold standby to the warm standby.

At Step A3, the control unit 6 judges whether or not the location information obtaining unit 3 has obtained the location information.

At Step A4, if the control unit 6 has obtained the location information from the location information obtaining unit 3 (Step A3: Yes), the control unit 6 generates the third notification information (the notification information with the location information) including the notification apparatus identifying information, the notification occurrence information, and the location information, and the control unit 6 outputs to the communication unit 5 the notification information thus generated. More specifically, if the control unit 6 obtains the location information after a predetermined time period has passed, the control unit 6 generates the third notification information (the notification information with the location information), and transmits the notification information thus generated, to the wireless communication device 21 via the communication unit 5.

At Step A5, if the control unit 6 fails to obtain the location information from the location information obtaining unit 3 (Step A3: No), the control unit 6 generates the first notification information (the notification information without the location information) including the notification apparatus identifying information and the notification occurrence information indicative of the occurrence of the notification, and the control unit 6 outputs to the communication unit 5 the notification information thus generated. More specifically, if the control unit 6 fails to obtain the location information, the control unit 6 generates the first notification information (the notification information without the location information), and transmits the notification information thus generated, to the wireless communication device 21 via the communication unit 5.

The wireless communication device 21, which received the notification information, generates the second notification information and transmits the second notification information to the server device 22, if the notification information received is the first notification information. Moreover, the wireless communication device 21, which received the notification information, transmits the third notification information to the server device 22, if the notification information received is the third notification information. After that, the server device 22, which received the second or the third notification information, transmits the second or the third notification information to the information generating apparatus 23.

At Step A6, the control unit 6 detects whether or not the notification apparatus 1 is in the stop condition, and if the control unit 6 detects that the notification apparatus 1 has transited to the stop condition (Step A6: Yes), the process is ended. Moreover, if the notification apparatus 1 has not been transited to the stop condition (Step A6: No), the process from Step A3 to A6 is repeated.

The operation of the information generating apparatus 23 will be described.

As illustrated in FIG. 4, to begin with, the information generating apparatus 23 receives the notification information (Step B1). Then, the information generating apparatus 23 judges whether or not the notification information that the information generating apparatus 23 received is the third notification information (Step B2). If the notification information thus received is the third notification information (Step B2: Yes), the information generating apparatus 23 generates the third-stage display information (Step B3). Moreover, if the information generating apparatus 23 fails to obtain the third notification information (Step B2: No), the information generating apparatus 23 judges whether or not the wireless communication device 21 that has received the second notification information is one (Step B4).

If the wireless communication device 21 that has received the second notification information is one (Step B4: Yes), the information generating apparatus 23 generates the first-stage display information (Step B5). If more than one wireless communication device 21 has received the second notification information (Step B4: No), the information generating apparatus 23 judges whether or not two wireless communication devices 21 have received the second notification information (Step B6).

If two wireless communication devices 21 have received the second notification information (Step B6: Yes), the information generating apparatus 23 determines which one of the two wireless communication devices 21 is a wireless communication device 21 with a greater intensity of the received radio waves, on the basis of the second notification information (Step B7). If more than two wireless communication devices 21 have received the second notification information (Step B6: No), the information generating apparatus 23 performs calculation by triangulation by using the installation locations of the wireless communication devices 21 that have received the second notification information (Step B8). After that, the information generating apparatus 23 generates the second-stage display information (Step B9).

Steps B1 to B8 will be described in detail.

At Step B1, the information generating apparatus 23 receives the second or third notification information form the server device 22.

At Step B2, the information generating apparatus 23 judges whether or not the information generating apparatus 23 received the third notification information. That is, if the notification information thus received includes the location information, the information generating apparatus 23 judges that the information generating apparatus 23 received the third notification information.

At Step B3, the information generating apparatus 23 generates the third-stage display information on the basis of the map information and the location information if the information generating apparatus 23 receives the third notification information. More specifically, the information generating apparatus 23 determines the installation location of the wireless communication device 21 on the map by using the location information. Then, the information generating apparatus 23 generates the third-stage display information for causing the terminal device 24 to display, on the map, the more specific location of the notification apparatus 1 from which the notification information was received, the report of the occurrence of the notification, the date and time of the occurrence of the notification, and/or the like.

At Step B4, if the information generating apparatus 23 receives the second notification information, the information generating apparatus 23 judges whether or not the wireless communication device 21 that received the second notification information is one. At Step B5, if the wireless communication device 21 that received the second notification information is one (Step B4: Yes), the information generating apparatus 23 generates the first-stage display information. More specifically, to begin with, the information generating apparatus 23 determines the installation location of the wireless communication device 21 on the map by using the notification apparatus identifying information identifying the notification apparatus 1. Then, the information generating apparatus 23 generates display information (first-stage display information) for causing the terminal device 24 to display, on the map, the installation location of the wireless communication device 21 that received the notification information, the report of the occurrence of the notification, the date and time of the occurrence of the notification, and/or the like.

At Step B6, if two wireless communication devices 21 received the second notification information (Step B4: No), the information generating apparatus 23 judges whether or not two wireless communication devices 21 received the second notification information.

At Step B7, if two wireless communication devices 21 received the second notification information (Step B6: Yes), the information generating apparatus 23 generates the first-stage display information. More specifically, at Step B7, if the information generating apparatus 23 receives two pieces of second notification information from two wireless communication devices 21, respectively, the information generating apparatus 23 determines a wireless communication device 21 with a greater intensity of received radio waves between the wireless communication devices 21, referring to the received radio wave intensity information. After that, at Step B5, the information generating apparatus 23 generates the first-stage display information by using the installation location of the wireless communication device 21 thus determined.

At Step B8, if the information generating apparatus 23 received three or more pieces of the second notification information from three or more wireless communication devices 21, respectively (Step B6: No), to begin with, the information generating apparatus 23 calculates out the position of the notification apparatus 1 on the basis of the triangulation by using the installation locations of three wireless communication devices 21 with greater intensities of received radio waves, referring to the received radio wave intensity information. Next, at Step B8, the information generating apparatus 23 generates the second-stage display information for displaying the result of the calculation of the triangulation on the map information.

An operation of the modification of the control device will be described.

As illustrated in FIG. 5, the control unit 6 detects that the activating unit 4 is in the pre-activation state (Step C1). Then, the control unit 6 outputs a stop signal to the alarm sound generating unit 2 (Step C2). Then, the control unit 6 causes the clock unit 7 to start to time (Step C3). Then, the control unit 6 obtains the location information from the location information obtaining unit 3 (Step C4). Then, the control unit 6 transmits the third notification information to the wireless communication device 21 (Step C5). Then, the control unit 6 judges whether the preset time has passed (Step C6). Then, if the preset time has passed (Step C6: Yes), the control unit 6 stops the transmission of the third notification information to the wireless communication device 21 (Step C7). Moreover, if the preset time has not passed (Step C6: No), the control unit 6 repeats the process from Step C4 to C5.

Steps C1 to C7 will be described in detail.

At Step C1, the control unit 6 detects that the activating unit 4 is in the pre-activation state (for example, the pull string of the personal buzzer alarm is restored).

At Step C2, if the control unit 6 detects that the activating unit 4 is in the preset state, the control unit 6 outputs to the alarm sound generating unit 2 the stop signal for stopping the alarm sounds, thereby to stop the alarm sounds.

As Step C3, the control unit 6 instructs the clock unit 7 to time for the predetermined preset time.

At Step C4, the control unit 6 obtains the location information from the location information obtaining unit 3. Then, at Step C5, the control unit 6 transmits the third notification information thus generated, to the wireless communication device 21 via the communication unit 5.

At Step C6, the control unit 6 judges whether or not the clock unit 7 has finished to time for the preset time. At Step C7, if the clock unit 7 has finished to time for the present time (Step C6: Yes), the control unit 6 stops the transmission of the third notification information. Moreover, the control unit 6 causes the location information obtaining unit 3 to transit to the cold standby.

Effects of Example Embodiment

As described above, according to the present example embodiment, the notification apparatus 1 is configured such that, in the normal situation, the communication unit 5 is at the cold standby. Moreover, the communication unit 5 employs the low-power wide-area wireless communication. In this way, the electricity consumption can be reduced. Therefore, frequent replacement or charging of a power source such as a battery mounted on the notification apparatus 1 is not necessary. Furthermore, the communication unit 5, which employs the low-power wide-area wireless communication, can reduce an increase of the communication cost, compared with the case where the wide-area wireless communication device is employed.

Moreover, the notification apparatus 1 is capable of transmitting the notification information via the communication unit 5 even in the period from when the activating unit 4 activated the alarm sound generating unit 2 to when the location information obtaining unit 3 becomes able to obtain the location information, that is, even in the period in which the location information obtaining unit 3 transits from the cold standby to the warm standby. Therefore, the notification apparatus 1 is capable of sending the notification to a range of places from short distance areas to remote areas soon after the notification is triggered by using the activating unit 4.

Moreover, if the activating unit 4 is restored to the pre-activation state (for example, the pull string of the personal buzzer alarm is restored), the notification information (the third notification information: the notification information with the location information) is continued for the preset time. Therefore, even in such a situation that the sounds of the buzzer are not heard by the other people, the low-power wide-area wireless communication can be continued, thereby making it possible to confirm the location of the notification apparatus 1 remotely. Thus, even if the dangerous situation persists, the rescue can be promptly carried out.

More specifically, even though it takes some time to obtain the location information (latitude and longitude) by using the location information obtaining unit 3 having been in the cold standby (complete stop state), the transmission of the notification information to the wireless communication device 21 can be carried out by using the low-power wide-area wireless communication until the location information is obtained by using the GPS. Thus, it is possible to roughly grasp the location of the occurrence of the notification made by the notification apparatus 1 (as a radial distance from the installation location of the wireless communication device 21 as the center).

Moreover, if a plurality of (three or more) wireless communication devices 21 each received the notification information, it is possible to roughly grasp the location of the occurrence of the notification by the triangulation. Moreover, the more specific location information is grasped after the location was roughly grasped, thereby making it possible to start to narrow down the location of the occurrence of the notification in a stepwise manner since the occurrence of the notification. Thus, appropriate measures to the notification can be taken by not only the parents, family members, teachers, and police, but also the taxi companies, local care supporters, and the like.

By narrowing down the location of the occurrence of the notification in the stepwise manner as described above, it is possible to achieve reduction of the electricity consumption and the communication cost without sacrificing speediness of the notification.

Program

A notification program according to one example embodiment of the invention can be any program, as long as the program causes a computer to execute Steps A1 to A6 illustrated in FIG. 3 and Steps C1 to C7 illustrated in FIG. 5. By installing and running this program on a computer, the notification apparatus and the notification method according to the present example embodiment can be realized. In this case, a processor of the computer functions and performs as the control unit 6.

Moreover, an information generating program according to one example embodiment of the invention can be any program, as long as the program causes a computer to execute Steps B1 to B9 illustrated in FIG. 4. By installing and running this program on a computer, the information generating apparatus and information generating method can be realized. In this case, a processor of the computer functions as information generation and performs the information generation apparatus.

Moreover, the information generating program according to the present example embodiment may be executed on a computer system structured by including a plurality of computers.

Physical Structure

Figure 6:
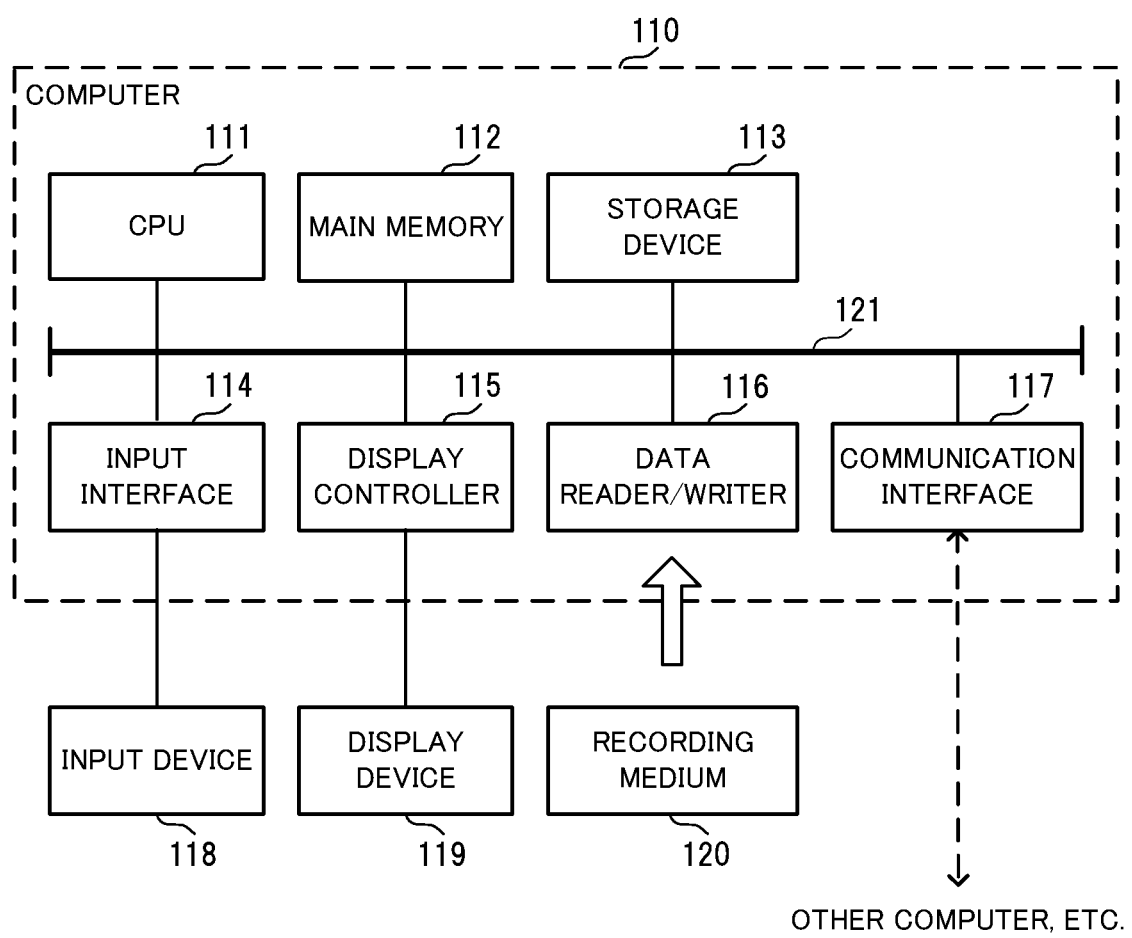
FIG. 6 is a view illustrating one example of a computer for realizing the information generating apparatus.

Here, a computer for realizing the information generating apparatus by carrying out the program according to the present example embodiment will be described referring to FIG. 6. FIG. 6 is a view illustrating one example of a computer for realizing the information generating apparatus.

As illustrated in FIG. 6, the computer 110 includes a CPU 111, a main memory 112, a storage device 113, an input interface 114, a display controller 115, a data reader/writer 116, and a communication interface 117. These units are connected with each other via a bus 121 in such a way that data communication is possible between these units. The computer 110 may include a GPU (Graphics Processing Unit) or an FPGA (Field-Programmable Gate Array) in addition to or instead of the CPU 111.

The CPU 111 decomposes on the main memory 112 the program (code) according to the present example embodiment from the storage device 113 where the program is stored, and carries out the program in a predetermined order, thereby performing various computations. The main memory 112 may be typically a volatile storage device such as a DRAM (Dynamic Random-Access Memory). Moreover, the program according to the present example embodiment is provided in such a form that the program is stored on a computer-readable recording medium 120. It should be noted that the program according to the present example embodiment may be provided on the Internet via the communication interface 117.

Moreover, concreate examples of the storage device 113 include a semiconductor storage device such as flash memory, apart from a hard disk drive. The input interface 114 is configured to interface data transmission between the CPU 111 and an input device 118 such as a keyboard and a mouse. The display controller 115 is connected with a display device 119 and is configured to control display on the display device 119.

The data reader/writer 116 is configured to interface data transmission between the CPU 111 and the recording medium 120, thereby to read out the program from the recording medium 120, and to write onto the recording medium 120 a result of the process performed by the computer 110. The communication interface 117 is configured to interface data transmission between the CPU 111 and another computer.

Moreover, concreate examples of the recording medium 120 include general-purpose semiconductor devices such as a CF (Compact Flash (registered trademark)) and an SD (Secure Digital), magnetic recording media such as a flexible disk, and optical recording media such as a CD-ROM (Compact Disk Read Only Memory).

It should be noted that the notification apparatus 1 according to the present example embodiment may be realized by using hardware corresponding to these units, instead of using the computer on which the program is installed. Further, the notification apparatus 1 may be realized by realizing part of the notification apparatus 1 with a program and the rest of the notification apparatus 1 with hardware.

[Supplementary Notes]

Regarding the example embodiment described above, Supplementary notes as below are also disclosed. Part or the whole of the example embodiment as described above can be expressed by the Supplementary notes 1 to 28 described below, but are not limited to the descriptions below.

(Supplementary Note 1)

A notification apparatus, including:

an alarm sound generating unit configured to generate alarm sounds;

a location information obtaining unit configured to obtain location information;

an activating unit configured to activate the alarm sound generating unit and the location information obtaining unit;

a communication unit configured to perform low-power wide-area wireless communication; and a control unit configured to transmit notification information via the communication unit if the control unit fails to obtain the location information from the location information obtaining unit after the activating unit activated the alarm sound generating unit, the notification information including notification apparatus identifying information for identifying the notification apparatus and notification occurrence information indicative of occurrence of notification.

(Supplementary Note 2)

The notification apparatus according to the Supplementary note 1, wherein the control unit is configured to transmit notification information via the communication unit if the control unit receives the location information after a predetermined time period has passed, the notification information including the notification apparatus identifying information, the notification occurrence information, and the location information.

(Supplementary Note 3)

The notification apparatus according to the Supplementary note 1 or 2, wherein the control unit is configured to stop the alarm sound generating unit if the activating unit is restored to a pre-activation state, and stops the location information obtaining unit after a predetermined preset time has passed.

(Supplementary Note 4)

A control method for a notification apparatus, including:

(a) a step of transmitting notification information via a communication unit that performs low-power wide-area wireless communication if location information cannot be obtained from a location information obtaining unit that obtains the location information after an activating unit activated an alarm sound generating unit that generates alarm sounds, the notification information including notification apparatus identifying information for identifying the notification apparatus and notification occurrence information indicative of occurrence of notification.

(Supplementary Note 5)

The control method for a notification apparatus according to Supplementary note 4, including:

(b) a step of transmitting notification information via the communication unit if the location information is obtained after a predetermined time period has passed, the notification information including the notification apparatus identifying information, the notification occurrence information, and the location information.

(Supplementary Note 6)

The control method for a notification apparatus according to Supplementary note 4 or 5, including:

(c) a step of stopping the alarm sound generating unit if the activating unit is restored to a pre-activation state, and stopping the location information obtaining unit after a predetermined preset time has passed.

(Supplementary Note 7)

A processor-readable recording medium that includes a control program for a notification apparatus recorded thereon, the program including instructions that causes a processor to carry out:

(a) a step of transmitting notification information via a communication unit that performs low-power wide-area wireless communication if location information cannot be obtained from a location information obtaining unit that obtains the location information after an activating unit activated an alarm sound generating unit that generates alarm sounds, the notification information including notification apparatus identifying information for identifying the notification apparatus and notification occurrence information indicative of occurrence of notification.

(Supplementary note 8)

A processor-readable recording medium being the processor-readable recording medium according to Supplementary note 7, wherein the program further includes instructions that cause the processor to execute:

(b) a step of transmitting notification information via the communication unit if the location information is obtained after a predetermined time period has passed, the notification information including the notification apparatus identifying information, the notification occurrence information, and the location information.

(Supplementary Note 9)

The processor-readable recording medium according to Supplementary note 7 or 8, wherein the program further includes instructions that cause the processor to execute:

(c) a step including stopping the alarm sound generating unit if the activating unit is restored to a pre-activation state, and stopping the location information obtaining unit after a predetermined preset time has passed.

(Supplementary Note 10)

A notification system, including:

a notification apparatus configured to transmit first notification information if the notification apparatus fails to obtain location information after an alarm sound generating unit configured to generate alarm sounds is activated, the first notification information including notification apparatus identifying information identifying the notification apparatus and notification occurrence information indicative of occurrence of notification;

a wireless communication device configured to transmit second notification information if the wireless communication device receives the first notification information, the second notification information including, in addition to the first notification information, wireless communication device identifying information identifying the wireless communication device that received the first notification information, received radio wave intensity information indicative of an intensity of received radio waves measured when the first notification information was received, and wireless communication date and time information indicative of a date and time at which the first notification information was received; and an information generating apparatus configured to generate display information if the information generating apparatus receives the second notification information, the display information being generated on the basis of the received radio wave intensity information and installation location information indicative of an installation location of the wireless communication device that received the first notification information, and the display information being for causing a terminal device to display, on a map, a location corresponding to the notification apparatus.

(Supplementary Note 11)

The notification system according to Supplementary note 10, wherein if the information generating apparatus receives two pieces of the second notification information from the two wireless communication devices, the information generating apparatus refers to the received radio wave intensity information and generates the display information on the basis of the installation location of the wireless communication device with a greater intensity of received radio waves.

(Supplementary Note 12)

The notification system according to Supplementary note 10 or 11, wherein if the information generating apparatus receives three or more pieces of the second notification information from the three or more wireless communication devices, the information generating apparatus refers to the received radio wave intensity information, calculates out the location of the notification apparatus by triangulation on the basis of the installation locations of the wireless communication devices with greater intensities of received radio waves, and generates the display information by using the location thus calculated out.

(Supplementary Note 13)

The notification system according to any one of Supplementary notes 10 to 12, wherein the notification apparatus transmits third notification information if the notification apparatus successfully obtains the location information after the alarm sound generating unit configured to generate the alarm sounds is activated, the third notification information including, in addition to the first notification information, the location information of the notification apparatus.

(Supplementary Note 14)

The notification system according to any one of Supplementary notes 10 to 13, wherein the notification apparatus stops the alarm sound generating unit if the activating unit is restored to a pre-activation state, and the notification apparatus stops the obtaining of the location information after a predetermined preset time has passed.

(Supplementary Note 15)

A notification method, including:

(a) a step of transmitting first notification information if location information cannot be obtained after an alarm sound generating unit configured to generate alarm sounds is activated, the first notification information including notification apparatus identifying information identifying the notification apparatus and notification occurrence information indicative of occurrence of notification;

(b) a step of transmitting second notification information if the first notification information is received, the second notification information including, in addition to the first notification information, wireless communication device identifying information identifying the wireless communication device that received the first notification information, received radio wave intensity information indicative of an intensity of received radio waves measured when the first notification information was received, and wireless communication date and time information indicative of a date and time at which the first notification information was received; and (c) a step of generating display information if the second notification information is received, the display information being generated on the basis of the received radio wave intensity information and installation location information indicative of an installation location of the wireless communication device that received the first notification information, and the display information being for causing a terminal device to display, on a map, a location corresponding to the notification apparatus.

(Supplementary note 16)

The notification method according to Supplementary note 15, wherein the (c) step includes, if two pieces of the second notification information are received from the two wireless communication devices, referring to the received radio wave intensity information and generating the display information on the basis of the installation location of the wireless communication device with a greater intensity of received radio waves.

(Supplementary Note 17)

The notification method according to Supplementary note 15 or 16, wherein the (c) step includes, if three or more pieces of the second notification information are received from the three or more wireless communication devices, referring to the received radio wave intensity information, calculating out the location of the notification apparatus by triangulation on the basis of the installation locations of the wireless communication devices with greater intensities of received radio waves, and generating the display information by using the location thus calculated out.

(Supplementary Note 18)

The notification method according to any one of Supplementary notes 15 to 17, wherein the (a) step includes transmitting third notification information if the location information is successfully obtained after the alarm sound generating unit configured to generate the alarm sounds is activated, the third notification information including, in addition to the first notification information, the location information of the notification apparatus.

(Supplementary Note 19)

The notification method according to any one of Supplementary notes 15 to 18, including:

(d) a step of stopping the alarm sound generating unit if the activating unit is restored to a pre-activation state, and stopping the obtaining of the location information after a predetermined preset time has passed.

(Supplementary Note 20)

An information generating apparatus, configured to generate display information if the information generating apparatus receives second notification information in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

(Supplementary Note 21)

The information generating apparatus according to Supplementary note 20, wherein if the information generating apparatus receives two pieces of the second notification information from the two wireless communication devices, the information generating apparatus refers to the received radio wave intensity information and generates the display information on the basis of the installation location of the wireless communication device with a greater intensity of received radio waves.

(Supplementary Note 22)

The information generating apparatus according to Supplementary note 20 or 21, wherein if the information generating apparatus receives three or more pieces of the second notification information from the three or more wireless communication devices, the information generating apparatus refers to the received radio wave intensity information, calculates out the location of the notification apparatus by triangulation on the basis of the installation locations of the wireless communication devices with greater intensities of received radio waves, and generates the display information by using the location thus calculated out.

(Supplementary Note 23)

An information generating method, including:

(a) a step of generating display information if second notification information is received in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

(Supplementary Note 24)

The information generating method according to Supplementary note 23, including:

(b) a step of, if two pieces of the second notification information are received from the two wireless communication devices, referring to the received radio wave intensity information and generating the display information on the basis of the installation location of the wireless communication device with a greater intensity of received radio waves.

(Supplementary Note 25)

The information generating method according to Supplementary note 23 or 24, including:

(c) a step of, if three or more pieces of the second notification information are received from the three or more wireless communication devices, referring to the received radio wave intensity information, calculating out the location of the notification apparatus by triangulation on the basis of the installation locations of the wireless communication devices with greater intensities of received radio waves, and generating the display information by using the location thus calculated out.

(Supplementary Note 26)

A computer-readable recording medium that includes a program recorded thereon, the program including instructions that causes a computer to carry out:

(a) a step of generating display information if second notification information is received in case where location information cannot be obtained after an alarm sound generating unit configured to generate alarm sounds is activated, the second notification information including, in addition to first notification information, wireless communication device identifying information identifying a wireless communication device that received the first notification information, received radio wave intensity information indicative of an intensity of received radio waves measured when the first notification information was received, and wireless communication date and time information indicative of a date and time at which the first notification information was received, the first notification information including notification apparatus identifying information identifying a notification apparatus and notification occurrence information indicative of occurrence of notification, and the display information being generated on the basis of the received radio wave intensity information and installation location information indicative of an installation location of the wireless communication device that received the first notification information, and being for causing a terminal device to display, on a map, a location corresponding to the notification apparatus.

(Supplementary Note 27)

The computer-readable recording medium according to Supplementary note 26, wherein the program further includes instructions that causes the computer to carry out:

(b) a step of, if two pieces of the second notification information are received from the two wireless communication devices, referring to the received radio wave intensity information and generating the display information on the basis of the installation location of the wireless communication device with a greater intensity of received radio waves.

(Supplementary Note 28)

The computer-readable recording medium according to Supplementary note 26 or 27, wherein the program further includes instructions that causes the computer to carry out:

(c) a step of, if three or more pieces of the second notification information are received from the three or more wireless communication devices, referring to the received radio wave intensity information, calculating out the location of the notification apparatus by triangulation on the basis of the installation locations of the wireless communication devices with greater intensities of received radio waves, and generating the display information by using the location thus calculated out.

So far, the invention of the present application has been described referring to the example embodiment, but it should be noted that the invention of the present application is not limited to the example embodiment. Any modifications and variations that a person skilled in the art can understand may be made to the configurations and details of the invention of the present application within the scope of the invention of the present application.

This application claims the benefit of the priority to the Japanese patent application No. 2018-058820 filed on Mar. 26, 2018, the entire disclosures of which are incorporated therein by reference.

INDUSTRIAL APPLICABILITY

As described above, according to the invention, it is possible to send notification to a range of places from short distance areas to remote areas, while reducing increases in the electricity consumption and the communication cost. The invention is useful in fields that requires emergency notification, such as crime prevention, and care giving support services.

REFERENCE SIGNS LIST

1: Notification Apparatus
2: Alarm Sound Generating Unit
3: Location Information Obtaining Unit
4: Activating Unit
5: Communication Unit
6: Control Unit
20: Notification System
21, 21a, 21b, 21c: Wireless Communication Device
22: Server Device
23: Information Generating Apparatus
24: Terminal Device
110: Computer
111: CPU
112: Main Memory
113: Storage Device
114: Input Interface
115: Display Controller
116: Data Reader/Writer
117: Communication Interface
118: Input Device
119: Display Device
120: Recording Medium
121: Bus

What is claimed is:

1. A notification apparatus, comprising:
a memory storing a notification apparatus identifier and information of an extension period; and
a processor configured to execute program instructions to:
activate an alarm in response to turning on a switch operated by a user;
obtain location information in response to turning on the switch;
transmit the notification apparatus identifier for the extension period after turning off the switch if obtaining the location information is failed.

2. The notification apparatus according to the claim 1, wherein
the processor is further configured to transmit notification information if the location information is received after a predetermined time period has passed, the notification information including the notification apparatus identifying information, the notification occurrence information, and the location information.

3. A control method for a notification apparatus, comprising:
   activating an alarm in response to turning on a switch operated by a user,
   obtaining location information in response to turning on the switch,
   transmitting a notification apparatus identifier for the extension period after turning off the switch if obtaining the location information is failed.

4. The control method for a notification apparatus according to claim 3, comprising:
   transmitting notification information if the location information is obtained after a predetermined time period has passed, the notification information including the notification apparatus identifying information, the notification occurrence information, and the location information.

5. A non-transitory computer-readable recording medium that includes a control program for a notification apparatus recorded thereon, the program including instructions that causes a processor to carry out:
   activating an alarm in response to turning on a switch operated by a user,
   obtaining location information in response to turning on the switch,
   transmitting a notification apparatus identifier for the extension period after turning off the switch if obtaining the location information is failed.

6. The non-transitory computer-readable recording medium according to claim 5, wherein the program further includes instructions that cause the processor to execute:
   transmitting notification information if the location information is obtained after a predetermined time period has passed, the notification information including the notification apparatus identifying information, the notification occurrence information, and the location information.

7. The notification apparatus according to the claim 1, wherein the processor is further configured to transmit the notification apparatus identifier and the location information in the extension period after the switch is turned off if the location information can be obtained.

8. The control method for a notification apparatus according to claim 3, further comprising transmitting the notification apparatus identifier and the location information in the extension period after the switch is turned off if the location information can be obtained.

9. The non-transitory computer-readable recording medium according to claim 5, wherein the program further includes instructions that cause the processor to execute:
   transmitting the notification apparatus identifier and the location information in the extension period after the switch is turned off if the location information can be obtained.

* * * * *